US009684187B2

(12) United States Patent
Rasier et al.

(10) Patent No.: US 9,684,187 B2
(45) Date of Patent: Jun. 20, 2017

(54) FLEXIBLE, SILICONE EYEGLASS FRAME WITHOUT LEGS

(71) Applicant: VEDERE ENDÜSTRI ÜRÜNLERI VE DIS TIC. LTD. STI, Istanbul (TR)

(72) Inventors: Rifat Rasier, Istanbul (TR); Sabri Ata Narin, Istanbul (TR)

(73) Assignee: Vedere Endüstri Ürünleri VE DIS TIC. LTD. STI (TR)

( * ) Notice: Subject to any disclaimer, the term of this patent is extended or adjusted under 35 U.S.C. 154(b) by 0 days.

(21) Appl. No.: 14/901,923

(22) PCT Filed: Jul. 4, 2014

(86) PCT No.: PCT/TR2014/000250
§ 371 (c)(1),
(2) Date: Dec. 29, 2015

(87) PCT Pub. No.: WO2015/002626
PCT Pub. Date: Jan. 8, 2015

(65) Prior Publication Data
US 2016/0147082 A1    May 26, 2016

(30) Foreign Application Priority Data

Jul. 4, 2013    (TR) .................................. 2013/08078

(51) Int. Cl.
| | | |
|---|---|---|
| G02C 5/08 | (2006.01) |
| G02C 5/12 | (2006.01) |
| G02C 3/00 | (2006.01) |
| G02C 5/00 | (2006.01) |

(52) U.S. Cl.
CPC ............. *G02C 5/128* (2013.01); *G02C 3/006* (2013.01); *G02C 5/008* (2013.01)

(58) Field of Classification Search
CPC .................................. G02C 5/124; G02C 5/128
USPC ........................................................ 351/64, 65
See application file for complete search history.

(56) References Cited

U.S. PATENT DOCUMENTS

| | | | | |
|---|---|---|---|---|
| 2004/0256249 | A1* | 12/2004 | Sarif ...................... | A45C 11/04 206/5 |
| 2011/0176101 | A1 | 7/2011 | Dighton | |
| 2012/0154737 | A1* | 6/2012 | Daole .................... | G02C 5/006 351/51 |
| 2013/0196284 | A1* | 8/2013 | Brawn ..................... | A61C 7/00 433/24 |

FOREIGN PATENT DOCUMENTS

| | | |
|---|---|---|
| CN | CN1885098 | 12/2006 |
| CN | CN201600513 U | 10/2010 |
| DE | 202005000660 U1 | 6/2006 |
| DE | 202006019042 U1 | 8/2007 |
| WO | WO2012069980 | 5/2012 |

\* cited by examiner

*Primary Examiner* — Huy K Mai
(74) *Attorney, Agent, or Firm* — Berenato & White, LLC

(57) ABSTRACT

The silicone eyeglass frame (1) according to the invention consists of a highly flexible and mobile siloxane structure. It is capable of being folded without being broken and of being directed to particular surfaces. Thanks to the material providing the frame to stand on the nose, the need for legs extending to the ears in the eyeglass frame (1) is eliminated.

20 Claims, 1 Drawing Sheet

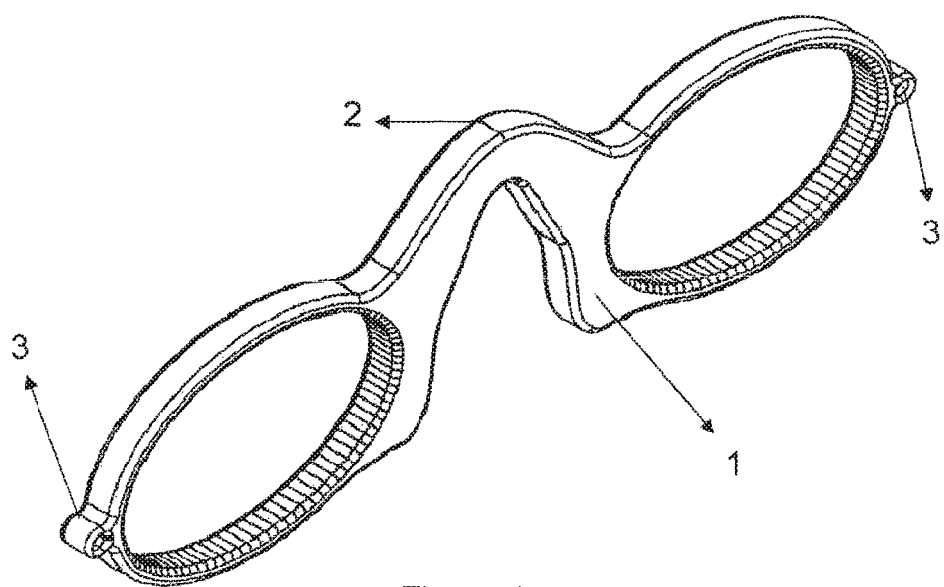
Figure 1
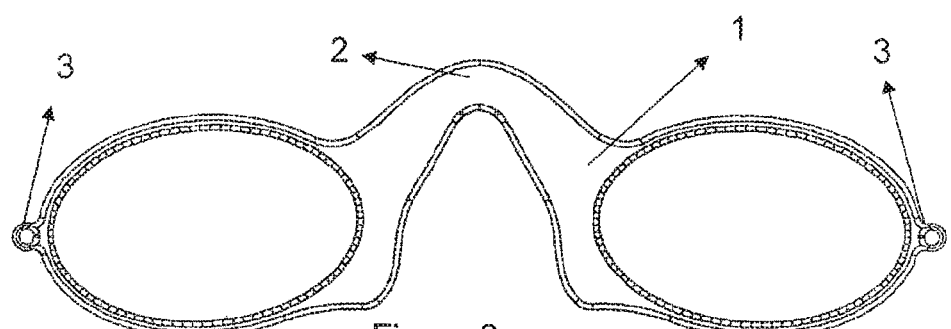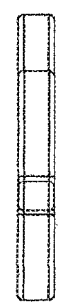
Figure 2a
Figure 2b
Figure 2c

FLEXIBLE, SILICONE EYEGLASS FRAME WITHOUT LEGS

TECHNICAL FIELD

The invention relates to an eyeglass frame which is formed without legs and attached to the eye without having breaking and deformation problems.

The invention especially relates to an eyeglass frame without legs which is capable of being folded without being broken and of being directed to particular surfaces and which comprises a flexible and mobile siloxane structure.

STATE OF THE ART

The eyeglass frames used in the prior art have legs, therefore, as they are thick in terms of volume and occupy too much space, carrying thereof in the pocket is more difficult. Moreover, said eyeglass frames may leave a mark in the back of the ear and thus, allergic reaction may develop. Another point is that, routinely used eyeglasses with legs are not made of flexible polydimethylsiloxane material. Therefore, deformation and breaking problems are frequently encountered.

In the literature, one of the patents with respect to the subject is the application no. CN1885098A. In said application, eyeglasses without legs which are fixed on the nose by means of various adhesives are disclosed. However, in this application made by using adhesive, the process of applying adhesive is required to be repeated. This situation, however, causes the eyeglass to fall when the adhesive loses its adhesive property.

Moreover, in the related application, in the bridge section of the eyeglass frame a ratchet mechanism made of rigid material and providing fixing by clamping the nose is disposed.

The application no. CN201600513U, however, relates to an eyeglass frame without legs whose fixing process is performed by a magnetic effect. In said application, in the nose section, the fixing is performed such that the areas formed in order to fix the eyeglass are magnetic and magnetic attraction is provided between the two sides of the nose.

In conclusion, due to the aforementioned drawbacks and inadequacy of the existing solutions regarding the subject matter, a development is required to be made in the related technical field.

OBJECT OF THE INVENTION

The present invention relates to silicone eyeglass frame which meets the aforementioned requirements, eliminates all the disadvantages and offers some additional advantages.

The primary object of the invention, with the flexible silicone eyeglass frame without legs, is to provide the frame to be attached on the nose, to prevent formation of any mark in the back of the ear and to reduce the allergic reactions. Besides, the frame becomes lighter, the thickness thereof is reduced, thus is carried easily.

Another object of the invention, thanks to the flexible structure of the eyeglass frame, is to eliminate the possibility of breaking by being deformed when put in the pocket or bag.

An object of the invention, thanks to the material of the eyeglass frame according to the invention, is to provide the frame to stand on the nose without falling without needing an extra apparatus.

An object of the invention is to provide different sizes of nose sections in order to provide the eyeglass frame to be adapted to different types of noses.

Yet another object of the invention is to provide the lenses to be easily replaced by the users as the obtained eyeglass frame does not comprise a skeleton.

FIGURES FACILITATING UNDERSTANDING OF THE INVENTION

FIG. 1 is the perspective view of the flexible, silicone eyeglass frame (1) without legs according to the invention.

FIG. 2a is the front view of the flexible, silicone eyeglass frame (1) without legs according to the invention.

FIG. 2b is the horizontal (from bottom) view of the flexible, silicone eyeglass frame (1) without legs according to the invention.

FIG. 2c is the side view of the flexible, silicone eyeglass frame (1) without legs according to the invention.

DESCRIPTION OF THE PART REFERENCES

1. Eyeglass frame
2. Nose area
3. Hole

DETAILED DESCRIPTION OF THE INVENTION

The silicone eyeglass frame (1) according to the invention consists of a highly flexible and mobile siloxane structure. It is capable of being folded without being broken and of being directed to particular surfaces. The flexible eyeglass frame (1) without legs, regarding the material from which it is produced, consists of types of polydimethylsiloxane. These can be polydimethylsiloxane derivatives, the use of polydimethylsiloxane at different percentages and the mixture thereof with other materials. Moreover, said material can consist of polydimethylsiloxane, low-density polyethylene (LDPE) and thermoplastic polyurethane (TPU), chemical derivatives of said substances and the mixtures thereof at different percentages. These materials can be mixed with softener chemicals at different ratios for providing the desired rigidity and softness of the eyeglass. Thanks to said material, the eyeglass frame (1) serves as a spring grasping the nose and can be attached to the nose without needing any additional apparatus. It is capable of standing attached to the nose without falling therefrom during the daily activities such as reading, despite the weight of the lenses. Therefore, the need for legs extending to the ears in the eyeglass frame (1) is eliminated.

Thanks to the flexible structure provided with the material, the sections of the eyeglass frame (1) holding the lenses are lifted 30 degrees above. The oval sections of the eyeglass frame (1) holding the lenses are produced by being positioned at different angles between 0 and 60 degrees according to the nose area (2).

Said eyeglass frame (1) is produced by using polydimethylsiloxane derivatives, the use of polydimethylsiloxane at different percentages and the mixture thereof with other materials. The production is performed with the injection molding method (LSR-liquid silicone rubber) or with the hot molding method (HTV—high temperature vulcanization).

By the sides of the silicone eyeglass frame (1) according to the invention, small silicone holes (3) are provided. The eyeglass frame (1) can be attached to the accessories through these holes (3). These accessories are necklace, eyeglass cord and retractable reel clips complementing the eyeglass. The most suitable sizes for the eyeglass frame (1) according to the invention are horizontally 116.637 mm in a way to incorporate the side holes (3) as well and 4.500 mm in terms of thickness. Said sizes can change according to the models and formal differences.

In an alternative embodiment of the invention, a material made of steel or plastic and having a spring property is embedded within the nose area (2) of the eyeglass frame (1) during production. This spring material provides the eyeglass frame (1) to be attached on the nose.

The invention claimed is:

1. A flexible silicone eyeglass frame (1) without legs, comprising a flexible and mobile siloxane structure capable of being folded without being broken and of being directed to particular surfaces.

2. The flexible silicone eyeglass frame (1) without legs according to claim 1, further comprising a steel or plastic material having a spring property embedded within a nose area (2) of the eyeglass frame (1) for attaching the eyeglass frame (1) to a nose of an eyeglass frame wearer.

3. The flexible silicone eyeglass frame (1) without legs according to claim 2, wherein the eyeglass frame (1) is made of polydimethylsiloxane.

4. The flexible silicone eyeglass frame (1) without legs according to claim 2, wherein the eye glass frame (1) is infection molded or hot molded.

5. The flexible silicone eyeglass frame (1) without legs according to claim 2, further comprising small silicone holes (3) by sides of the eyeglass frame, the small silicone holes being configured to attach to an accessory selected from a necklace, an eyeglass cord, and retractable reel clips complementing the eyeglass frame (1).

6. The flexible silicone eyeglass frame (1) without legs according to claim 1, wherein the eyeglass frame (1) is made of polydimethylsiloxane.

7. The flexible silicone eyeglass frame (1) without legs according to claim 6, wherein the eyeglass frame (1) is injection molded or hot molded.

8. The flexible silicone eyeglass frame (1) without legs according to claim 6, further comprising small silicone holes (3) by sides of the eyeglass frame, the small silicone holes being configured to attach to an accessory selected from a necklace, an eyeglass cord, retractable reel clips complementing the eyeglass frame (1).

9. The flexible silicone eyeglass frame (1) without legs according to claim 6, wherein the polydimethylsiloxane comprises a polydimethylsiloxane derivative.

10. The flexible silicone eyeglass frame (1) without legs according to claim 1, wherein the eyeglass frame (1) is injection molded or hot molded.

11. The flexible silicone eyeglass frame (1) without legs according to claim 10, further comprising small silicone boles (3) by sides of the eyeglass frame, the small silicone holes being configured to attach to an accessory selected from a necklace, an eyeglass cord, and retractable reel clips complementing the eyeglass frame (1).

12. The flexible silicone eyeglass frame (1) without legs according to claim 1, further comprising small silicone holes (3) by sides of the eyeglass frame (1), the small silicone holes being configured to attach to an accessory selected from a necklace, an eyeglass cord, and retractable reel clips complementing the eyeglass frame (1).

13. A flexible silicone eyeglass frame without legs, comprising a flexible and mobile siloxane structure adapted to be folded without being broken and configured to attach to a nose of an eyeglass frame wearer.

14. The flexible silicone eyeglass frame without legs according to claim 13, wherein the siloxane structure comprises polydimethylsiloxane.

15. The flexible silicone eyeglass frame without legs according to claim 13, wherein the siloxane structure comprises a polydimethylsiloxane derivative.

16. The flexible silicone eyeglass frame without legs according to claim 13, wherein the eyeglass frame has sides comprising silicone holes configured to attach to an accessory selected from a necklace, an eyeglass cord, and retractable reel clips complementing the eyeglass frame.

17. A flexible silicone eyeglass frame without legs, comprising:
    a flexible and mobile siloxane structure adapted to be folded without being broken; and
    a steel or plastic material having a spring property embedded within a nose area of the eyeglass frame and configured to attach the eyeglass frame to a nose of an eyeglass frame wearer.

18. The flexible silicone eyeglass frame without legs according to claim 17, wherein the siloxane structure comprises polydimethylsiloxane.

19. The flexible silicone eyeglass frame without legs according to claim 17, wherein the siloxane structure comprises a polydimethylsiloxane derivative.

20. The flexible silicone eyeglass frame without legs according to claim 17, wherein the eyeglass frame has sides comprising silicone holes configured to attach to an accessory selected from a necklace, an eyeglass cord, and retractable reel clips complementing the eyeglass frame.

* * * * *